(12) United States Patent
Giannetti

(10) Patent No.: US 7,273,331 B2
(45) Date of Patent: Sep. 25, 2007

(54) BORING BAR HAVING INTERNAL COOLANT SUPPLY

(76) Inventor: Enrico R. Giannetti, 615 County Rd. 216, East Bernard, TX (US) 77435

( * ) Notice: Subject to any disclaimer, the term of this patent is extended or adjusted under 35 U.S.C. 154(b) by 112 days.

(21) Appl. No.: 11/024,578

(22) Filed: Dec. 29, 2004

(65) Prior Publication Data
US 2006/0140728 A1   Jun. 29, 2006

(51) Int. Cl.
*B23P 15/28* (2006.01)
(52) U.S. Cl. .............................. 407/11; 407/41; 407/108
(58) Field of Classification Search ................. 407/11, 407/41, 49, 94, 108; 408/56, 57, 59; 404/135
See application file for complete search history.

(56) References Cited

U.S. PATENT DOCUMENTS

| | | | |
|---|---|---|---|
| 4,848,198 A * | 7/1989 | Royal et al. ................. | 82/1.11 |
| 5,340,242 A * | 8/1994 | Armbrust et al. ............ | 407/11 |
| 5,718,156 A * | 2/1998 | Lagrolet et al. ............. | 82/1.11 |
| 6,652,200 B2 * | 11/2003 | Kraemer ..................... | 407/11 |

* cited by examiner

*Primary Examiner*—Willmon Fridie, Jr.
(74) *Attorney, Agent, or Firm*—James L Jackson

(57) ABSTRACT

A boring bar has a shank having a cutter support head at one end. A flow passage extends longitudinally through the shank to the cutter support head and intersects a transverse flow passage that is defined in part by a clamp screw passage of the head. A metal cutting insert is clamped to the cutter support head by a clamp that is secured by a clamp screw being threaded into the clamp screw passage. The clamp member defines at least one coolant fluid flow passage having a discharge opening or openings each located and oriented to direct a jet of coolant fluid onto the metal cutting insert immediately at the site of cutting engagement within the rotating workpiece. The clamp screw defines an internal passage that communicates with the transverse coolant fluid flow passage and conducts coolant fluid onto the metal cutting insert. Alternatively, an annular clearance is defined about the shank of the clamp screw and serves as a coolant flow passage which is in fluid communication with the internal coolant fluid discharge passage or passages of the clamp member.

26 Claims, 7 Drawing Sheets

BORING BAR HAVING INTERNAL COOLANT SUPPLY

BACKGROUND OF THE INVENTION

1. Field of the Invention

The present invention relates generally to boring bars that are mounted to machine tools and are used for boring internal surfaces in work pieces that are typically rotated by a machine tool. More particularly the present invention pertains to boring bars having an internal coolant supply to discharge a liquid coolant and cutting fluid medium immediately at the site of metal cutting by a metal cutting insert of a boring bar. Even more specifically, a clamp releasably securing a metal cutting insert to the cutter support head of a boring bar defines a coolant flow passage having an exit or discharge opening directed immediately at the site of metal cutting by the insert maintains the metal cutting insert as cool as possible during boring operations and thereby minimizes heat induced wear and deterioration and thus enhances the service life of the metal cutting insert.

2. Description of the Prior Art

During metal cutting operations, especially when heavy cuts of metal are taken during rough metal cutting, it is typical for the metal cutting machine to be provided with a coolant fluid conduit through which a coolant and metal cutting fluid medium is pumped to the site of metal cutting. Typically, a fluid supply conduit, such as a flexible coolant supply hose in communication with the discharge of a coolant supply pump, is provided which can be selectively oriented for delivery of the flowing coolant fluid medium to the cutter insert of the machine tool. The continuous supply of coolant fluid to the metal cutting site minimizes heat build-up at the metal cutting site and thus maintains lower working or cutting temperature of the metal cutting element and ensures its extended service life.

When metal cutting operations are carried out internally of a rotating workpiece, such as is the case when boring operations are being carried out, the boring bar being used can have considerable length, thus making it difficult to efficiently support a coolant supply tube or hose and conduct an adequate supply of coolant fluid to the immediate region of the metal cutting insert of the boring bar. It is desirable, therefore, to provide a metal boring tool system that does not require a coolant supply conduit to be supported along the length of a boring bar and which ensures efficient and adequate delivery of coolant fluid to the immediate site of metal cutting for maintaining the cutting tool and the metal being cut within a predetermined temperature range.

SUMMARY OF THE INVENTION

It is a principal feature of the present invention to provide a novel boring bar having one or more internal passages for flow of coolant and/or cutting fluid medium therethrough and having a metal cutting insert mount mechanism thereon that defines one or more fluid distribution passages directing the flow of the coolant fluid medium to the immediate site of metal cutting by the boring bar;

It is another feature of the present invention to provide a novel boring bar having a fluid flow passage extending longitudinally therethrough and supplying a flow of coolant fluid to a distribution passage system of the cutter support head of the boring bar, which is oriented for delivery of coolant fluid to the point of metal cutting of a replaceable metal cutting insert that is mounted to the head structure of the boring bar;

It is also a feature of the present invention to provide a novel boring bar having a head structure to which a metal cutting insert is releasably fixed by a clamp assembly and with a clamp member of the clamp assembly defining a portion of a coolant fluid supply passage and having a coolant fluid distribution opening that is located to direct a jet of coolant fluid onto the metal cutting insert and at the immediate vicinity of metal cutting during a boring operation; and It is an even further feature of the present invention to provide a novel boring bar assembly wherein a clamp is secured to a boring bar head by a clamp screw for supporting a replaceable metal cutting insert and wherein the clamp and clamp screw cooperate with the head structure of the boring bar to define one or more coolant fluid flow passages having at least one coolant fluid discharge opening on the clamp for directing one or more jets of coolant fluid to the immediate site of metal cutting.

Briefly, the various objects and features of the present invention are realized through the provision of a boring bar having an elongate shank having an integral cutter support head structure at one end. A coolant fluid flow passage extends longitudinally through the shank of the boring bar to the cutter support head and intersects a transverse coolant fluid flow passage which is defined in part by a clamp screw passage. A replaceable metal cutting insert is clamped to the cutter support head structure by a clamp member that is secured by a clamp screw being threaded into the clamp screw passage. The clamp screw, and its association with the cutter support head structure, may define an internal or eternal flow passage permitting fluid flow transition from the longitudinal boring bar flow passage and through the head and clamp structures. The clamp member defines one or more internal coolant fluid flow passages that terminate at one or more discharge openings located on the clamp member. The discharge opening or openings are each located and oriented to direct a discharge or jet of coolant fluid onto the metal cutting insert immediately at the site of its metal cutting operation within the rotating workpiece. In a preferred embodiment of the invention the clamp screw defines an internal passage that is in communication with the transverse coolant fluid flow passage and conducts coolant fluid to the internal coolant fluid flow passage or passages of the clamp member for precise distribution of coolant flow to the metal cutting insert. In an alternative embodiment of the invention, an annular clearance is defined about the shank of the clamp screw and which serves as a flow passage. This annular flow passage is in fluid communication with the internal coolant fluid discharge passage or passages of the clamp member.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is a plan view of a boring bar having coolant fluid supply passages therein according to the principles of the present invention, and representing the preferred embodiment of the invention;

FIG. 2 is a side elevational view of the boring bar of FIG. 1;

FIG. 3 is a rear elevational view of the boring bar of FIG. 1, showing a coolant flow passage longitudinally within the shank of the boring bar with the inlet of the coolant flow passage being internally threaded for attachment of the connector of a coolant supply conduit to the boring bar;

Figure 1:
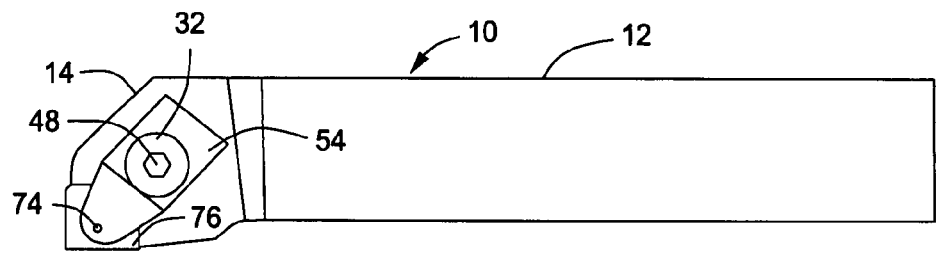
Figure 2:
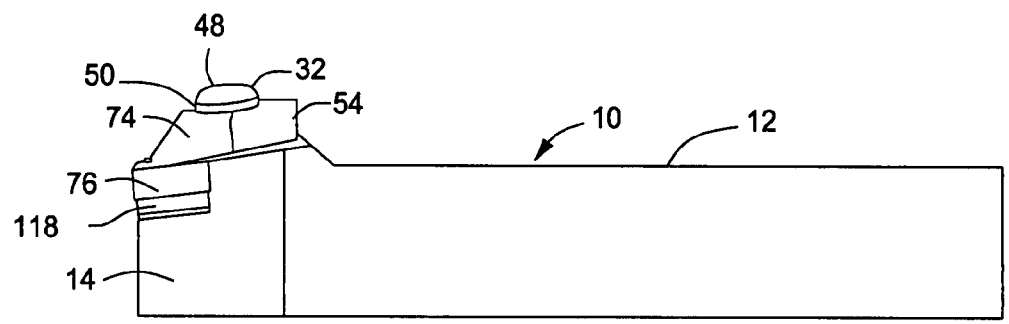
Figure 3:
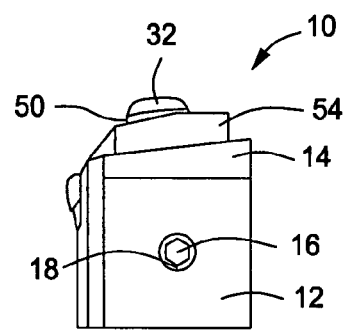
Figure 4:
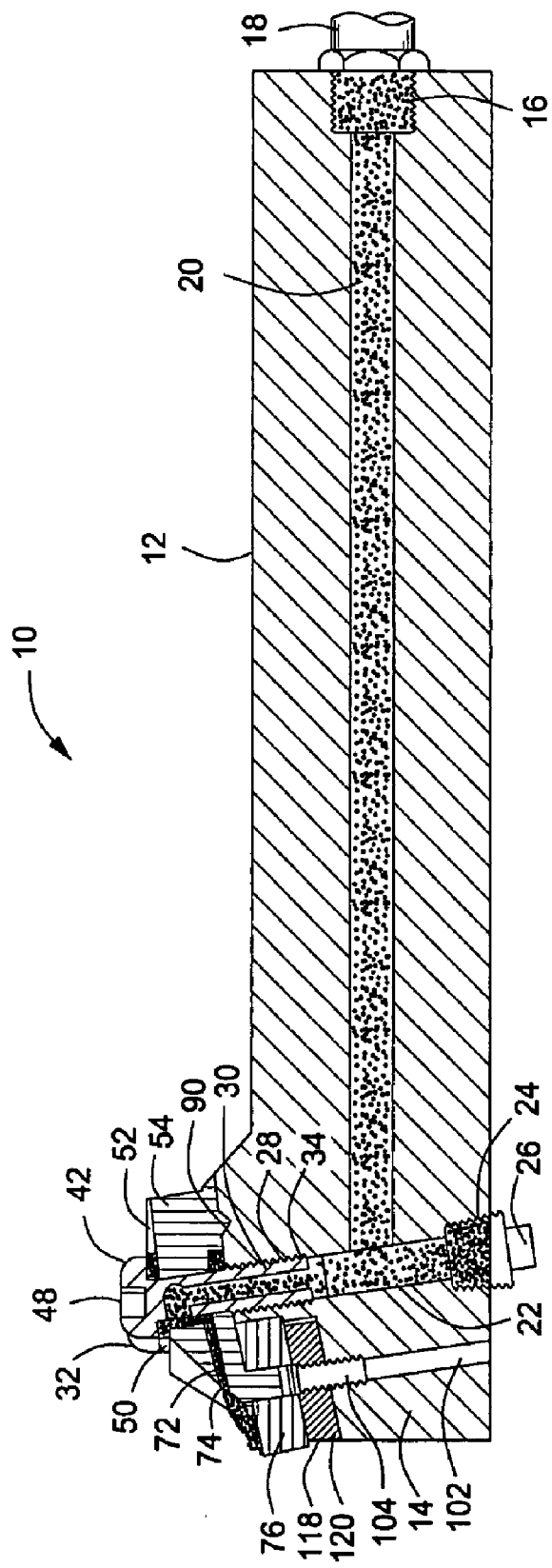
Figure 5:
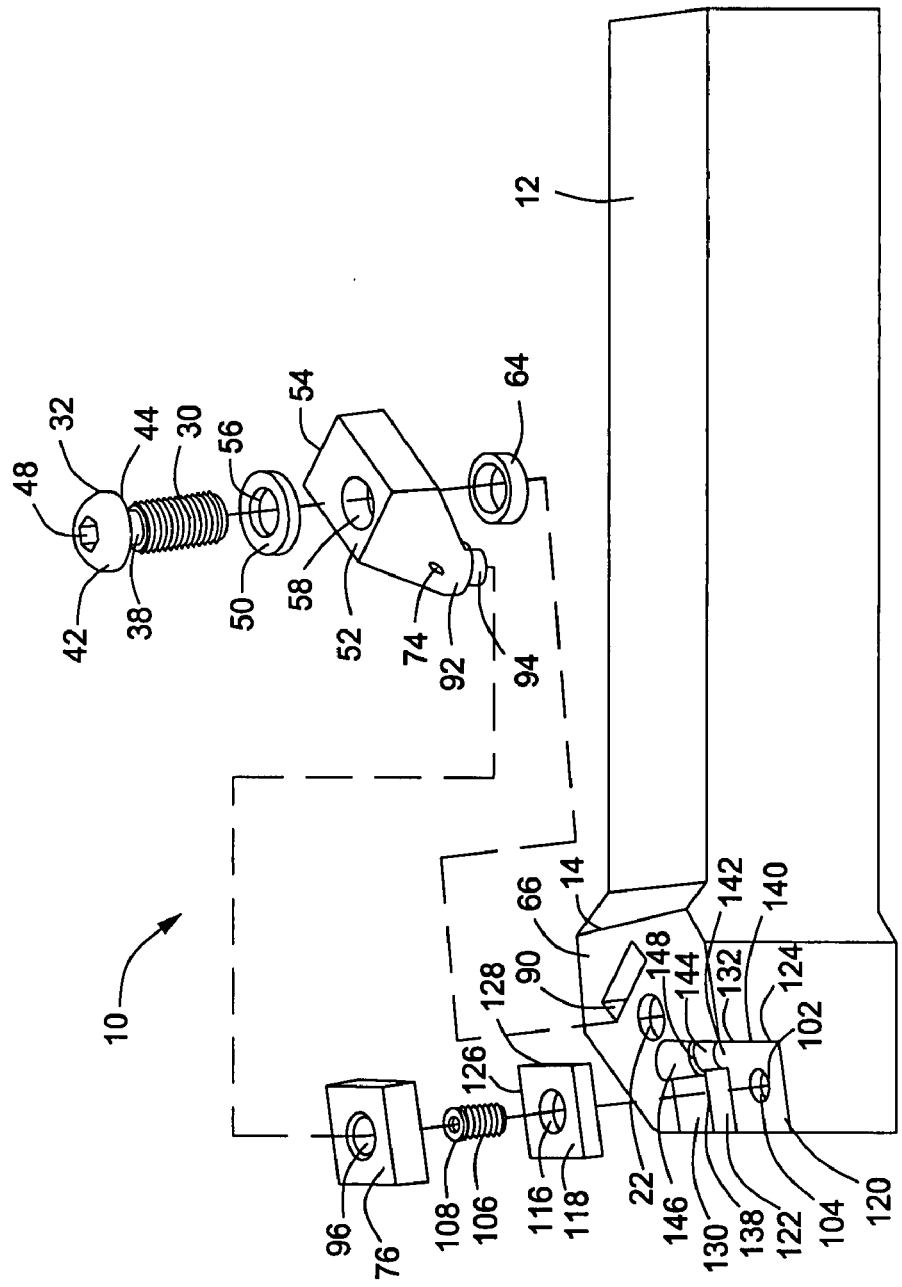
Figure 6:
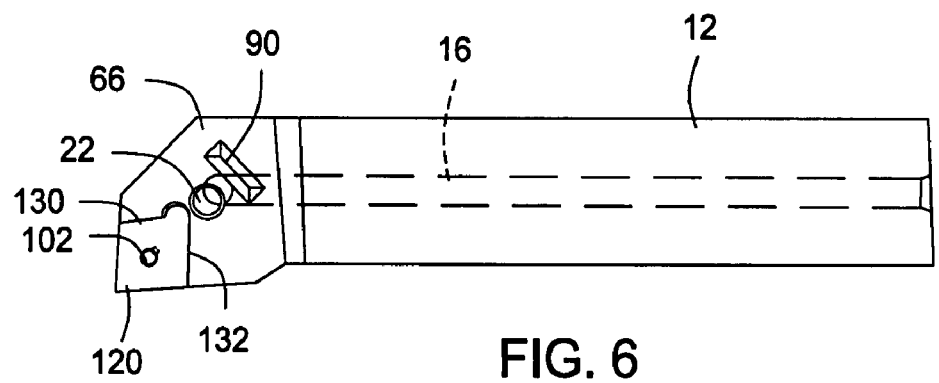
Figure 7:
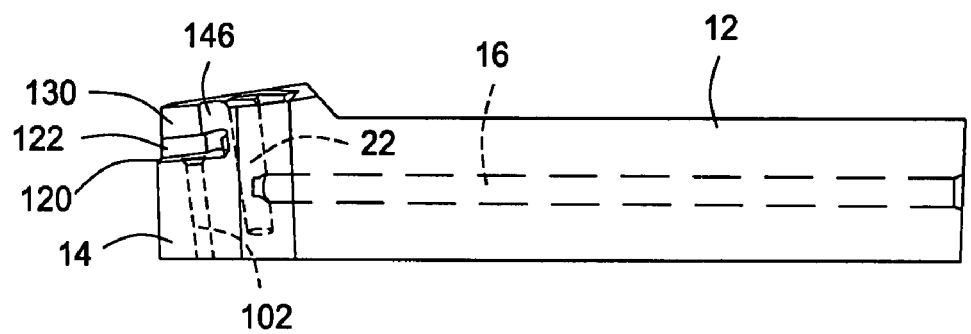
Figure 8:
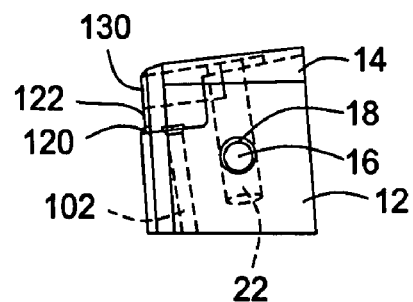
Figure 9:
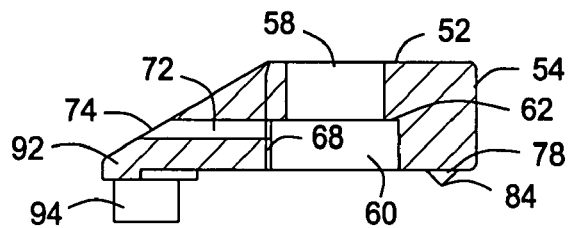
Figure 10:
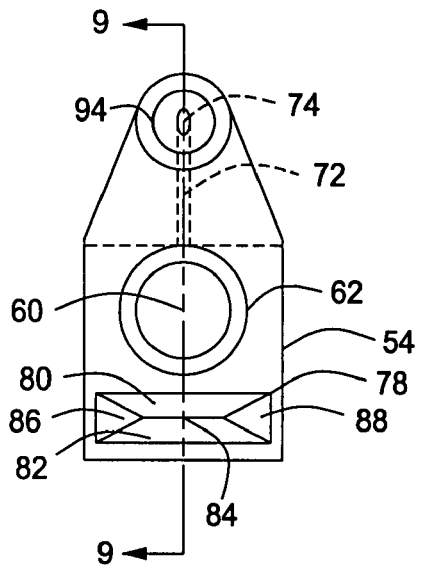
Figure 11:
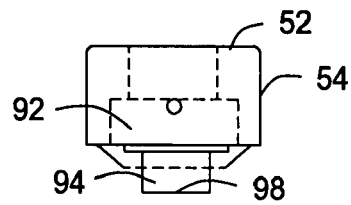
Figure 12:
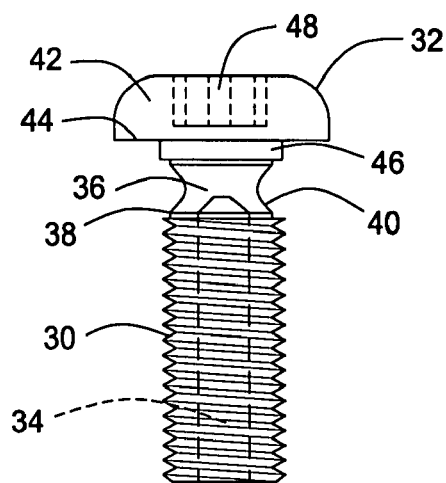
Figure 13:
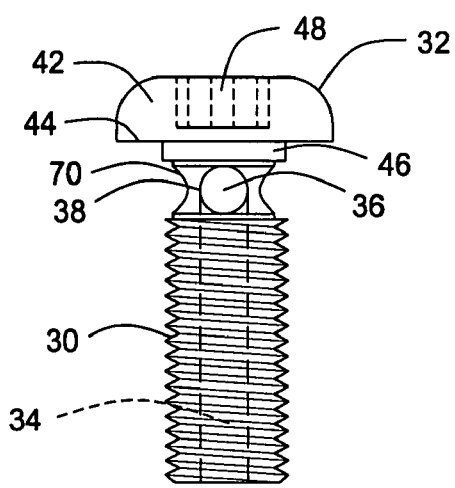
Figure 14:
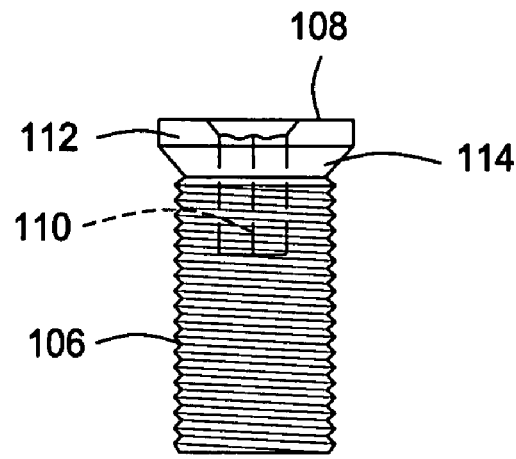
Figure 15:
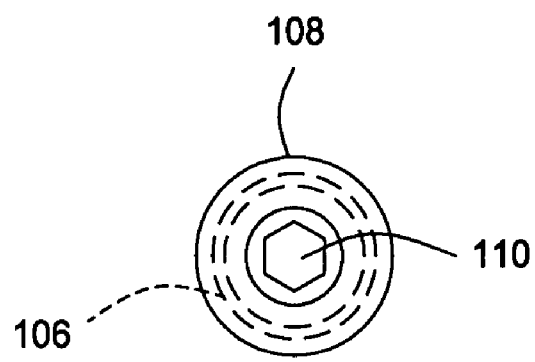

FIG. 4 is a longitudinal sectional view of the boring bar of FIGS. 1-3, showing an internal longitudinal coolant flow passage through the shank and showing a cutter support head and clamp assembly having metal cutting insert being secured in assembly therewith and having a coolant supply passage extending from the internal longitudinal coolant flow passage to a coolant discharge opening directed at the metal cutting insert;

FIG. 5 is an exploded isometric illustration of the boring bar of FIGS. 1-5;

FIG. 6 is a plan view of the integral shank and head structure of the boring bar of FIGS. 1-5 and showing the internal coolant flow passage thereof in broken line;

FIG. 7 is a side elevational view of the integral shank and head structure of the boring bar of FIG. 6, showing coolant flow passage and cutter mounting receptacles in broken line;

FIG. 8 is a rear elevational view of the boring bar of FIGS. 6 and 7, showing the coolant entry opening and connector receptacle of the longitudinal flow passage and the cutter insert mounting receptacles in broken line;

FIG. 9 is a sectional view of a clamp member for retaining cutting inserts in assembly with the integral shank and head structure of the boring bar of FIGS. 4-6;

FIG. 10 is a bottom view of the clamp member of FIG. 9;

FIG. 11 is a front elevational view of the clamp member of FIGS. 9 and 10;

FIG. 12 is an elevational view of a clamp screw member for retention of the clamp member in secure assembly with the head structure of the boring bar and having broken lines showing a longitudinal coolant flow passage extending therethrough;

FIG. 13 is an elevational view of the clamp screw being offset 90° from the position of FIG. 12 and showing a transverse coolant flow passage in communication with the longitudinal coolant flow passage of the shank of the boring bar;

FIG. 14 is an elevational view of a seat screw that is employed for retention of a seat member in assembly with the head structure of the boring bar;

FIG. 15 is a plan view of the seat screw of FIG. 14; and

Figure 16:
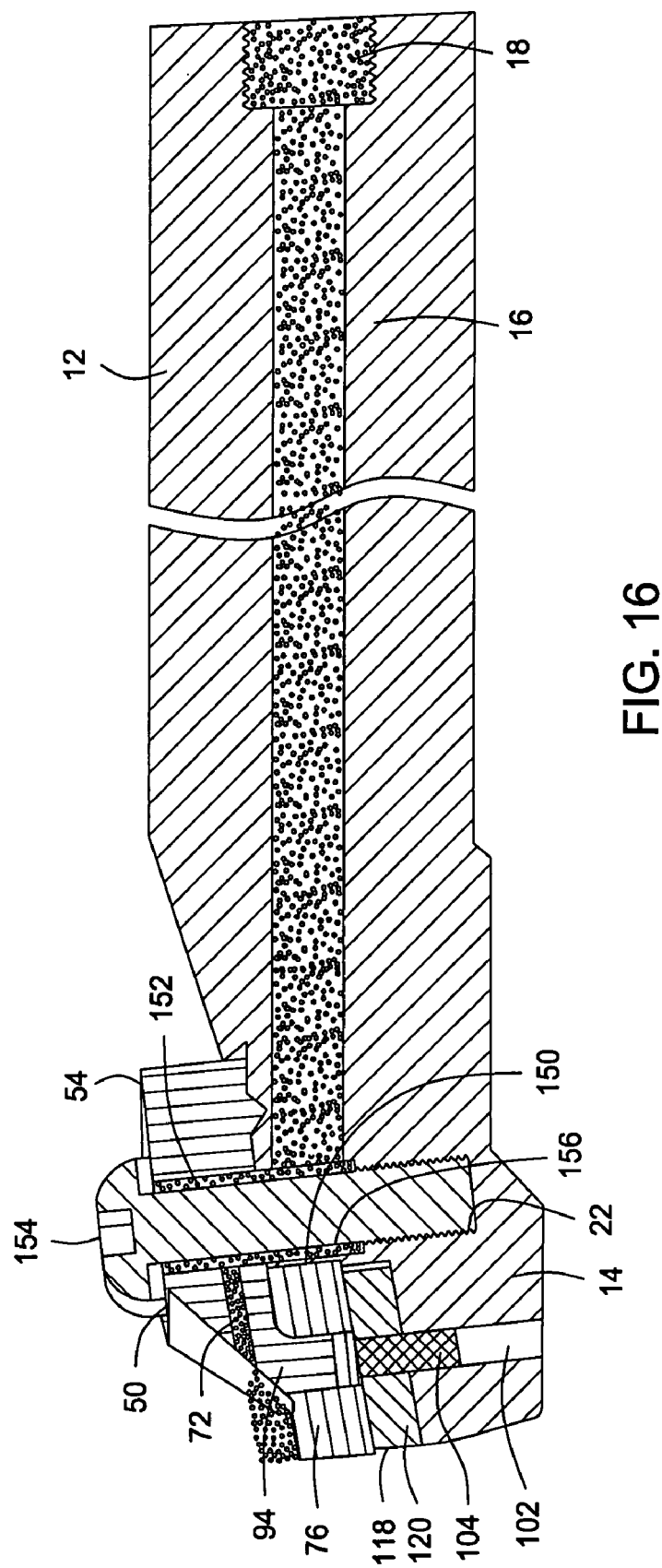

FIG. 16 is a partial longitudinal sectional view showing a boring bar representing an alternative embodiment of the invention and having coolant fluid supply passages therein according to the principles of the present invention,

DETAILED DESCRIPTION OF PREFERRED EMBODIMENT

Referring now to the drawings and first to FIGS. 1-3 a coolant fluid supplying boring bar is shown generally at 10, having a coolant fluid flow passage therein and representing the preferred embodiment of the present invention. The boring bar 10 comprises an elongate shank 12 having a coolant supplying cutter support head 14 integral therewith. As is evident from the longitudinal sectional view FIG. 4 a coolant fluid flow passage 16 extends longitudinally through the elongate shank 12 to the coolant supplying cutter support head 14 and is provided with an internally threaded receptacle 18. The receptacle 18 is adapted to receive a connector fitting 20 of a fluid supply conduit, such as a flexible coolant fluid supply hose that that is in fluid communication with the discharge passage of a coolant fluid supply pump of a boring machine tool. The coolant fluid flow passage 16 intersects a transverse coolant fluid supply passage 22 that extends through the cutter support head 14 and defines an internally threaded receptacle 24 that is adapted to receive a threaded closure plug member 26. If the internally threaded receptacle 18 is closed by a similar threaded closure plug, the transverse coolant fluid supply passage 22 will serve as an alternative coolant fluid inlet passage, with the connector 20 of a coolant fluid supply conduit being threaded into the internally threaded receptacle 24. This feature provides machine operator personnel with a choice of coolant conduit connection that best suits the machining operation to be conducted.

A portion of the transverse coolant fluid supply passage 22 also serves as a screw passage and is internally threaded as shown at 28 to receive the threaded shank 30 of a clamp screw 32. The clamp screw defines a longitudinal internal coolant fluid flow passage 34, as is evident particularly in FIGS. 4, 12 and 13, which is in fluid communication with the transverse coolant fluid flow passage 22 and thus conducts coolant fluid flow from the passages 16 and 22 to a transverse screw passage 36 which defines at least one and preferably a pair of opposed coolant fluid outlets 38 and 40. The clamp screw 32 defines a screw head 42 having an annular downwardly facing retainer shoulder 44 which is located immediately above an annular seal washer locator surface 46. The screw head 42 defines a screw actuator receptacle 48 which is preferably in the form of a hex or Torx receptacle or may conveniently take the form of a slotted or Phillips receptacle if desired. When threaded to its full extent within the threaded section 28 of the transverse coolant fluid supply passage 22, the annular downwardly facing retainer shoulder 44 is in retaining engagement with a seal washer member 50 and forces the seal washer member into tightly seated and sealed relation with an upper surface 52 of a clamp member 54, which is shown in FIG. 4 and in greatest detail in FIGS. 9-11. During tightening movement of the clamp screw 32 by a hex or Torx wrench the annular seal washer locator surface 46 engages within a central opening 56 of the seal washer member 50 and causes centering of the seal washer member with respect to the transverse coolant fluid supply passage 22. This feature ensures that the seal washer member establishes fluid tight sealing with the surface 52 entirely about a retainer screw opening 58 of the retainer member 54. This feature also ensures against leakage of the coolant fluid medium from the retainer screw opening 58.

As is evident particularly in FIGS. 9 and 10, as well as FIGS. 4 and 5, the clamp member 54 defines a downwardly facing seal receptacle 60 that is preferably concentric with the retainer screw opening and has an annular seal retainer shoulder 62. An annular seal member 64 is at least partially received within the downwardly facing seal receptacle 60 and is forced by the annular seal retainer shoulder 62 into sealed engagement with the clamp member 54 and with an upper surface 66 of the boring bar head structure 14. The annular seal member 64 may be composed of any suitable resilient or elastomeric sealing material or it may be composed of any metal or non-metal material that is capable of establishing sealing between the clamp member and the head structure of the boring bar when the clamp screw 32 is tightened. The clamp member 54 defines an internal slot 68 which is sealed at its upper end by the seal washer member 50 and is in fluid communication with an annular groove or recess 70 within which the coolant fluid outlet openings 38 and 40 are located. The clamp member also defines a coolant discharge passage 72 extending from the internal slot 68 to a discharge opening 74. If desired, the clamp member may define a plurality of coolant discharge passages having a plurality of coolant discharge openings if additional or more efficient cooling can be achieved. The coolant fluid discharge passage 72 and the discharge opening 74 are oriented and located to project a jet of coolant fluid strategically onto a metal cutting insert 76 so that the cutting edge of the metal cutting insert and the metal being cut receive continuous cooling. The service life of the metal cutting insert and the efficiency of metal cutting is enhanced when the cutting temperature is controlled by an efficient and accurately directed and controlled flow of coolant immediately at the site of the metal cutting operation.

The clamp member 54 is located and stabilized in part by a downwardly extending locator projection 78 which is of elongate configuration and is defined by oppositely inclined downwardly converging side cam surfaces 80 and 82 that intersect at an elongate rather sharp ridge 84. The downwardly extending locator projection 78 also defines oppositely inclined downwardly converging end cam surfaces 86 and 88 that intersect the ridge 84 and define the ends of the ridge. The downwardly extending locator projection 78 is received by a clamp location and stabilizing receptacle 90 having a corresponding downwardly converging tapered configuration and permits the downwardly extending locator projection 78 to establish substantial surface to surface locking and stabilizing engagement with the head structure 14 of the boring bar as indicated particularly in FIG. 4. This feature prevents movement of the clamp member 54 even when subjected to the forces of heavy or rough metal cutting by the replaceable metal cutting insert 76, especially during the initial stage of machining.

The clamp member 54 also defines a retainer nose portion 92 on which is integrally formed a cutter insert locator projection 94 of generally cylindrical configuration. The cutter insert locator projection 94 is received within a central opening 96 of the cutter insert member 76 for precision location of the replaceable cutter insert member 76 on the coolant supplying cutter support head 14. When seated to its full extent the lower end 98 of the cutter insert locator projection 94 is located in close fitting relation within the central opening 96 of the cutter insert to ensure against shifting of the cutter insert even under the influence of the significant forces of rough metal cutting. The central opening 96 is also of generally cylindrical configuration and thus ensures against any lateral as well as vertical movement of the cutter element relative to the clamp member 54.

The head structure 14 of the boring bar 10 is drilled or otherwise formed to define a passage 102, as shown in FIG. 4, which includes an internally threaded section 104 that receives the threaded shank 106 of a seat screw 108, which is shown in greater detail in FIGS. 14 and 15. The seat screw 108 defines a screw actuator receptacle 110 which may be of hex or Torx form or may have any other screw actuator receptacle form as desired. The seat screw 108 also defines a screw head 112 having a tapered shoulder surface 114 that establishes locating and stabilizing engagement within a central correspondingly tapered annular internal surface 116 that defines at least a portion of a opening 117 of a seat member 118. The seat screw is tightened to force the seat member 118 into supported engagement with a seat support shoulder 120 of the head structure 14. The seat support shoulder 120 is oriented at a desired angle, with respect to the center-line of the boring bar shank 12, to achieve desired orientation of the seat member 118 and the metal cutting insert 76 for optimum metal cutting and extended service life of the metal cutting insert.

Generally planar seat locator and stabilizer surfaces 122 and 124 are defined by the head structure 14 and are oriented for precision location and stabilization of respective side surfaces 126 and 128 of the generally rectangular seat member 118. When the seat member is secured in place by the seat screw 108, the planar seat locator and stabilizer surfaces 122 and 124 prevent the seat member from being rotated or otherwise moved by the forces encountered during machining. Precision location of the seat member 118 on the seat and cutter support shoulder surface 120 is controlled by interaction of the tapered shoulder surface 114 of the seat screw 108 with the correspondingly tapered internal surface that is defined within the seat member 118. Generally planar cutter insert locator surfaces 130 and 132 are also defined by the head structure 14 and are oriented in angular relation for precision location and support with corresponding side surfaces or edges 134 and 136 of the generally rectangular cutter insert 76. Support ledges 138 and 140 are defined at the juncture of the seat locator and stabilizer surfaces 122 and 124 and the cutter insert locator surfaces 130 and 132 to provide support for respective lower edges of the metal cutting insert 76. A corner relief recess 142 is also defined in the head structure 14 and is defined in part by curved or arcuate corner relief recess surfaces 144 and 146 at the juncture of the seat and cutter insert support and stabilization surfaces. The corner relief recess 142 ensures that a corner of the seat member 118 and metal cutting insert 76, are free from contact with the locating and stabilizing surfaces of the head structure 14. The corner relief recess 142 is also defined in part by a curved or arcuate ledge 148 which exists due to the differing dimensions of the locating and stabilizing surfaces of the head structure 14.

With reference to FIGS. 6-8, it should be borne in mind that the transverse coolant fluid supply passage 22 may be drilled or otherwise formed so that it does not extend completely through the head structure 14 of the boring bar 10. In such case, the passage 22 merely extends a sufficient distance to establish fluid flow conducting communication with the longitudinal coolant fluid flow passage 16 which is evident particularly as shown in broken line in FIG. 7. The coolant fluid supply passages are arranged as shown in FIG. 4 if it is intended to provide the user with the capability of selectively connecting a coolant fluid supply conduit to the internally threaded receptacle 18 of the shank 12 or to the internally threaded receptacle 24 of the head structure 14. In either case, a threaded plug member is employed as a closure for the unused internally threaded receptacle 18 or 24.

As shown in the preferred embodiment of FIG. 4 coolant fluid flow from the transverse coolant fluid supply passage 22 to the coolant fluid discharge passage 72 of the clamp member 54 occurs via a longitudinal coolant fluid flow passage 34 of the clamp screw 32. It should be borne in mind that coolant fluid flow may also or alternatively occur externally of the clamp screw. As shown in the alternative embodiment of FIG. 16, the screw passage is enlarged to provide an annular clearance externally of the clamp screw which serves as an annular flow passage for coolant flow. In this case, the clamp screw will not be provided with an internal longitudinal flow passage. Like components of FIG. 16, as compared with FIG. 4, are shown by like reference numerals.

As shown in FIG. 16, the head structure 14 is machined to define a clamp screw passage section 150 having a dimension exceeding the external diameter of the shank 152 of a clamp screw 154, thus establishing an annular flow passage 156 that surrounds the shank of the clamp screw. This annular flow passage intersects the longitudinal coolant fluid flow passage 16 of the boring bar shank 12 and thus permits the flow of coolant fluid from the shank of the boring bar, through the head structure to the flow passages 72 of the clamp member 54. Unlike the clamp screw 32 of FIG. 4, the clamp screw 154 has a shank 152 that does not define an internal longitudinal flow passage. Rather, the flow passage 156 is defined by an annular space that is cooperatively defined by the external surface of the clamp screw shank 152 and the enlarged internal surface of the clamp screw passage section 150. The shank 152 of the clamp screw also defines an annular space with the internal surface of the passage 58 through the clamp member, which annular space is an extension or continuation of the annular flow passage 156. The upper end of this annular space is closed and sealed by the seal washer 50. The annular seal member 64 establishes sealing of the annular flow passage at the lower portion of the clamp member 54 as explained above. The function of the embodiment of FIGS. 4 and 16 are essentially the same, with the exception that fluid flow along the shank of the clamp screw differs. In each case, the flow of coolant fluid from the longitudinal flow passage of the shank 12 of the boring bar 10 is transitioned through the head structure 14 to the clamp member 54 and is then conducted through the clamp member to one or more discharge openings 72 that are located and oriented to direct the flow of coolant fluid directly onto the cutter insert 76 to the immediate region of contact of the cutter insert within the rotating workpiece.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A coolant fluid supplying boring bar, comprising:
   an elongate shank member having an integral cutter support head at one end thereof and defining an internal coolant fluid flow passage extending within said elongate shank member and within said integral cutter support head;
   a transverse coolant fluid flow passage being defined at least partially in said cutter support head and having fluid communication with said internal coolant fluid flow passage and with said internal clamp fluid flow passage;
   said integral cutter support head defining a cutter support seat;
   a clamp member being releasably seated on said integral cutter support head and securing a metal cutting insert in cutting position on said cutter support seat, said clamp member defining at least one internal clamp fluid flow passage having at least one discharge outlet opening being located and oriented to direct a discharge of coolant fluid from said internal clamp fluid flow passage onto said metal cutting insert, and
   said internal clamp fluid flow passage being in fluid communication with said internal coolant fluid flow passage.

2. The coolant fluid supplying boring bar of claim 1, comprising:
   said elongate shank member having a fluid inlet end having a fluid inlet opening and defining a threaded receptacle at said coolant inlet opening, said threaded receptacle receiving a threaded connector of a coolant fluid supply conduit.

3. The coolant fluid supplying boring bar of claim 1, comprising:
   a clamp retainer member extending through said clamp member and into said cutter support head and retaining said clamp member in releasable assembly with said cutter support head; and
   a coolant fluid passage being defined internally of said clamp retainer member and having fluid communication with said internal coolant fluid flow passage and having an outlet in communication with said internal clamp fluid flow passage.

4. The coolant fluid supplying boring bar of claim 3, comprising:
   said clamp retainer member being a clamp retainer screw having an externally threaded section being threaded into said cutter support head.

5. The coolant fluid supplying boring bar of claim 1, comprising:
   a clamp screw receptacle being defined in said cutter support head and having fluid communication with said internal coolant fluid flow passage and with said internal clamp fluid flow passage, said clamp screw receptacle having an internally threaded section; and
   a clamp retainer screw having a screw shank defining an externally threaded section being threaded into said internally threaded section of said transverse coolant fluid flow passage, said screw shank defining an internal fluid passage in communication with said coolant fluid flow passage and having an outlet in communication with said internal clamp fluid flow passage.

6. The coolant fluid supplying boring bar of claim 1, comprising:
   a clamp screw receptacle being defined in said cutter support head and having fluid communication with said internal coolant fluid flow passage and with said internal clamp fluid flow passage, said clamp screw receptacle having an internally threaded section; and
   a clamp retainer screw having a screw shank defining an externally threaded section being threaded into said internally threaded section of said transverse coolant fluid flow passage, said clamp retainer screw shank having annular clearance within said cutter support head defining an internal annular fluid passage externally of said screw shank and being in communication with said coolant fluid flow passage, said annular fluid passage also being in fluid communication with said internal clamp fluid flow passage.

7. The coolant fluid supplying boring bar of claim 1, comprising:
   a transverse coolant fluid flow passage being defined in said cutter support head and having fluid communication with said internal coolant fluid flow passage and with said internal clamp fluid flow passage, said transverse coolant fluid flow passage having a fluid inlet opening and defining a threaded receptacle at said coolant inlet opening, and a threaded connector of a coolant fluid supply conduit having threaded engagement within said threaded receptacle.

8. The coolant fluid supplying boring bar of claim 1, comprising:

a clamp retainer member extending through said clamp member and into said cutter support head and retaining said clamp member in releasable assembly with said cutter support head;

a first seal member sealing said clamp retainer member with respect to said clamp member and preventing leakage of coolant fluid; and a second seal member sealing said clamp member with respect to said cutter support head.

9. A coolant fluid supplying boring bar, comprising:

an elongate shank member having an integral cutter support head at one end thereof and defining an internal coolant fluid flow passage extending within said elongate shank member and within said integral cutter support head;

said integral cutter support head defining a cutter support seat;

a clamp member being releasably seated on said integral cutter support head and securing a metal cutting insert in cutting position on said cutter support seat, said clamp member defining at least one internal clamp fluid flow passage having at least one discharge outlet opening being located and oriented to direct a discharge of coolant fluid from said internal clamp fluid flow passage onto said metal cutting insert, said internal clamp fluid flow passage being in fluid communication with said internal coolant fluid flow passage; and a clamp retainer screw extending through said clamp member and being threaded into said cutter support head and securing said clamp member in releasable clamping engagement with said cutter support head and with the metal cutting insert, said clamp retainer screw and said cutter support head defining a flow passage in communication with said internal coolant fluid flow passage and with said internal clamp fluid flow passage.

10. The coolant fluid supplying boring bar of claim 9, comprising:

a coolant fluid passage being defined internally of said clamp retainer screw and having fluid communication with said internal coolant fluid flow passage and with said internal clamp fluid flow passage.

11. The coolant fluid supplying boring bar of claim 9, comprising:

a coolant fluid passage being defined externally of said clamp retainer screw and having fluid communication with said internal coolant fluid flow passage and with said internal clamp fluid flow passage.

12. The coolant fluid supplying boring bar of claim 9, comprising:

said elongate shank member having a fluid inlet end having a fluid inlet opening and defining a threaded receptacle at said coolant inlet opening, said threaded receptacle receiving a threaded connector of a coolant fluid supply conduit.

13. The coolant fluid supplying boring bar of claim 9, comprising:

a transverse coolant fluid flow passage being defined at least partially in said cutter support head and having fluid communication with said internal coolant fluid flow passage and with said internal clamp fluid flow passage.

14. The coolant fluid supplying boring bar of claim 9, comprising:

a clamp screw receptacle being defined in said cutter support head and having fluid communication with said internal coolant fluid flow passage and with said internal clamp fluid flow passage, said clamp screw receptacle having an internally threaded section; and said clamp retainer screw having a screw shank defining an externally threaded section being threaded into said internally threaded section of said transverse coolant fluid flow passage, said screw shank defining an internal fluid passage in communication with said coolant fluid flow passage and having an outlet in communication with said internal clamp fluid flow passage.

15. The coolant fluid supplying boring bar of claim 9, comprising:

a clamp screw receptacle being defined in said cutter support head and having fluid communication with said internal coolant fluid flow passage and with said internal clamp fluid flow passage, said clamp screw receptacle having an internally threaded section; and said clamp retainer screw having a screw shank defining an externally threaded section being threaded into said internally threaded section of said transverse coolant fluid flow passage, said clamp retainer screw shank having annular clearance within said cutter support head defining an internal annular fluid passage externally of said screw shank and being in communication with said coolant fluid flow passage, said annular fluid passage also being in fluid communication with said internal clamp fluid flow passage.

16. The coolant fluid supplying boring bar of claim 9, comprising:

a transverse coolant fluid flow passage being defined in said cutter support head and having fluid communication with said internal coolant fluid flow passage and with said internal clamp fluid flow passage, said transverse coolant fluid flow passage having a fluid inlet opening and defining a threaded receptacle at said coolant inlet opening, and a threaded connector of a coolant fluid supply conduit having threaded engagement within said threaded receptacle.

17. The coolant fluid supplying boring bar of claim 9, comprising:

a clamp retainer screw extending through said clamp member and into said cutter support head and retaining said clamp member in releasable assembly with said cutter support head;

a first seal member sealing said clamp retainer member with respect to said clamp member and preventing leakage of coolant fluid; and a second seal member sealing said clamp member with respect to said cutter support head.

18. A coolant fluid supplying boring bar, comprising:

an elongate shank member having an integral cutter support head at one end thereof and defining an internal coolant fluid flow passage extending within said elongate shank member said internal coolant fluid flow passage having a coolant inlet opening and an internally threaded receptacle;

said integral cutter support head defining a cutter support seat and defining a transverse fluid flow passage being in communication with said internal coolant fluid flow passage;

a clamp member being releasably seated on said integral cutter support head and securing a metal cutting insert in cutting position on said cutter support seat, said clamp member defining at least one internal clamp fluid flow passage having at least one discharge outlet opening being located and oriented to direct a discharge of coolant fluid from said internal clamp fluid flow passage onto said metal cutting insert, said internal clamp fluid flow passage being in fluid communication with said transverse fluid flow passage; and a clamp retainer screw extending through said clamp member and being threaded into said cutter support head and securing said clamp member in releasable clamping engagement with said cutter support head and with the metal cutting insert, said clamp retainer screw and said cutter support head defining a flow passage in communication with said internal coolant fluid flow passage and with said internal clamp fluid flow passage.

19. A coolant fluid supplying machine tool for mounting to a machining system, comprising:

an elongate shank member having an integral cutter support head at one end thereof and defining an internal coolant fluid flow passage within said integral cutter support head and having a threaded coolant fluid supply connector for connection of a coolant supply conduit thereto;

said integral cutter support head defining a cutter support seat;

a clamp member being releasably seated on said integral cutter support head and securing a metal cutting insert in cutting position on said cutter support seat, said clamp member defining at least one internal clamp fluid flow passage in fluid communication with said internal coolant fluid supply passage having at least one discharge outlet opening being located and oriented to direct a discharge of coolant fluid from said internal clamp fluid flow passage onto said metal cutting insert; and a clamp retainer screw extending through said clamp member and establishing threaded retaining engagement with said cutter support head and securing said clamp member in releasable clamping engagement with said cutter support head and with the metal cutting insert, said clamp retainer member and said cutter support head defining a coolant fluid flow passage in communication with said internal coolant fluid supply passage and with said internal clamp fluid flow passage.

20. The coolant fluid supplying machine tool of claim 19, comprising:

a coolant fluid passage being defined internally of said clamp retainer screw and having fluid communication with said internal coolant fluid flow passage and with said internal clamp fluid flow passage.

21. The coolant fluid supplying machine tool of claim 19, comprising:

said coolant fluid passage being defined internally of said clamp retainer member and having fluid communication with said internal coolant fluid flow passage and with said internal clamp fluid flow passage.

22. The coolant fluid supplying machine tool of claim 19, comprising:

said coolant fluid passage being defined externally of said clamp retainer member and having fluid communication with said internal coolant fluid flow passage and with said internal clamp fluid flow passage.

23. The coolant fluid supplying machine tool of claim 19, comprising:

said elongate shank member having a coolant fluid supply passage extending therethrough and defining fluid inlet end having a fluid inlet opening and defining a first threaded connector at said coolant inlet opening, said threaded receptacle receiving a threaded connector of a coolant fluid supply conduit;

said internal coolant fluid flow passage of said integral cutter support head having fluid communication with said coolant fluid supply passage of said elongate shank member and defining a second threaded coolant fluid supply connector; and a threaded closure member being selectively connectible with one of said first or second threaded connectors for closing the same.

24. The coolant fluid supplying machine tool of claim 19, comprising:

a clamp screw receptacle being defined in said cutter support head and having fluid communication with said internal coolant fluid flow passage and with said internal clamp fluid flow passage, said clamp screw receptacle having an internally threaded section; and said clamp retainer screw having a screw shank defining an externally threaded section being threaded into said internally threaded section of said transverse coolant fluid flow passage, said screw shank defining an internal fluid passage in communication with said coolant fluid flow passage and having an outlet in communication with said internal clamp fluid flow passage.

25. The coolant fluid supplying machine tool of claim 19, comprising:

a clamp screw receptacle being defined in said cutter support head and having fluid communication with said internal coolant fluid flow passage and with said internal clamp fluid flow passage, said clamp screw receptacle having an internally threaded section; and said clamp retainer screw having a screw shank defining an externally threaded section being threaded into said internally threaded section of said transverse coolant fluid flow passage, said clamp retainer screw shank having annular clearance within said cutter support head defining an internal annular fluid passage externally of said screw shank and being in communication with said coolant fluid flow passage, said annular fluid passage also being in fluid communication with said internal clamp fluid flow passage.

26. The coolant fluid supplying machine tool of claim 19, comprising:

a clamp retainer screw extending through said clamp member and into said cutter support head and retaining said clamp member in releasable assembly with said cutter support head;

a first seal member sealing said clamp retainer member with respect to said clamp member and preventing leakage of coolant fluid; and a second seal member sealing said clamp member with respect to said cutter support head.

* * * * *